United States Patent
Ling et al.

(10) Patent No.: US 12,319,773 B2
(45) Date of Patent: Jun. 3, 2025

(54) CARRIER FOR OLEFIN POLYMERIZATION CATALYST, AND PREPARATION METHOD THEREFOR AND APPLICATION THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Yongtai Ling, Beijing (CN); Xianzhi Xia, Beijing (CN); Yuexiang Liu, Beijing (CN); Weili Li, Beijing (CN); Jin Zhao, Beijing (CN); Futang Gao, Beijing (CN); Chunhong Ren, Beijing (CN); Yang Tan, Beijing (CN); Tao Liu, Beijing (CN); Long Chen, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 879 days.

(21) Appl. No.: 17/286,765

(22) PCT Filed: Oct. 15, 2019

(86) PCT No.: PCT/CN2019/111253
§ 371 (c)(1),
(2) Date: Apr. 19, 2021

(87) PCT Pub. No.: WO2020/078353
PCT Pub. Date: Apr. 23, 2020

(65) Prior Publication Data
US 2021/0371552 A1 Dec. 2, 2021

(30) Foreign Application Priority Data
Oct. 19, 2018 (CN) .......................... 201811224586.4

(51) Int. Cl.
C08F 4/00 (2006.01)
C08F 4/659 (2006.01)
C08F 10/06 (2006.01)

(52) U.S. Cl.
CPC .......... *C08F 4/65916* (2013.01); *C08F 10/06* (2013.01); *C08F 2410/01* (2013.01); *C08F 2410/06* (2021.01); *C08F 2410/07* (2021.01)

(58) Field of Classification Search
None
See application file for complete search history.

(56) References Cited

U.S. PATENT DOCUMENTS

| 4,027,088 A | 5/1977 | Matsuura et al. |
| 4,425,258 A | 1/1984 | Tanaka et al. |

FOREIGN PATENT DOCUMENTS

| CN | 1062737 A | 7/1992 |
| CN | 102039184 A | 5/2011 |

(Continued)

*Primary Examiner* — Yun Qian
(74) *Attorney, Agent, or Firm* — NKL Law; Allen Xue

(57) ABSTRACT

A carrier for an olefin polymerization catalyst contains a magnesium-containing compound and sulfur. The sulfur is at least one of an elemental sulfur, a complex sulfur, and a compound sulfur. The carrier has good particle morphology and a smooth surface, and has a narrow particle size distribution. The catalyst prepared from the carrier has high (Continued)

activity and good sensitivity to hydrogen regulation, and can improve the density of a polymer stack when being used for olefin polymerization.

23 Claims, 5 Drawing Sheets

(56) References Cited

FOREIGN PATENT DOCUMENTS

| | | | |
|---|---|---|---|
| CN | 102040683 | A | 5/2011 |
| CN | 102807632 | A | 12/2012 |
| CN | 104558282 | A | 4/2015 |
| CN | 104974280 | A | 10/2015 |
| EP | 0492788 | A2 * | 1/1992 |
| EP | 2345675 | A1 | 7/2011 |
| JP | S56070004 | A | 6/1981 |
| JP | H06041220 | A | 2/1994 |

* cited by examiner

CARRIER FOR OLEFIN POLYMERIZATION CATALYST, AND PREPARATION METHOD THEREFOR AND APPLICATION THEREOF

CROSS-REFERENCE TO RELATED APPLICATIONS

This application is a U.S. national phrase entry of PCT International Application No. PCT/CN2019/111253, filed on Oct. 15, 2019, which claims the priority to Chinese patent application CN201811224586.4 filed on Oct. 19, 2018, entitled "Spherical carrier for olefin polymerization catalyst and preparation method thereof, catalyst component and catalyst and use thereof", the entirety of which is incorporated herein by reference.

FIELD OF THE INVENTION

The present disclosure relates to the field of olefin polymerization, and in particular, relates to a carrier for olefin polymerization catalyst and a preparation method thereof, as well as a catalyst component for olefin polymerization and a catalyst and an olefin polymerization method.

BACKGROUND OF THE INVENTION

Recent years have witnessed rapid development in the polypropylene industry and a constantly rising proportion of polypropylene in general plastics and even in special plastics. This is mainly because of the advancement of catalyst technology, the development of propylene polymerization technology, and the accompanying further expansion of performance of propylene polymers. Catalysts for propylene polymerization include Ziegler-Natta catalysts, metallocene catalysts, and non-metallocene catalysts. Among them, Ziegler-Natta catalysts have always been the most important catalytic system in propylene polymerization production. Ziegler-Natta catalysts started in 1950s and remain one of the main catalysts in industrial production after having been upgraded many times. Research on Ziegler-Natta catalysts has also always been one of the hot spots in research on catalysts for propylene polymerization.

Due to the morphological characteristics of spherical catalysts for propylene polymerization and the phenomenon of "duplication" from catalysts to polymers (which means only a spherical catalyst can be used to obtain a spherical polymer), catalyst having spherical morphology are significantly advantageous in polymerization production and in subsequent processing of polymers and are particularly beneficial to production of polymer alloys. This is why spherical catalysts account for a very large proportion in currently used industrial catalysts for propylene polymerization. A spherical carrier and an internal electron donor are two important components of a spherical catalyst for propylene polymerization. The spherical carrier is mainly derived from a magnesium chloride alkoxide carrier. Specifically, magnesium chloride and an alcohol are reacted at a high temperature to form a magnesium chloride alkoxide; the magnesium chloride alkoxide is melted and dispersed in an inert component to form an emulsion through high shear action; the emulsion is then moved into a low-temperature medium so that the alkoxide is solidified and molded to obtain the carrier. In the process of producing the carrier, melting at a high temperature and solidification at a low temperature are required, which consumes much energy. In order to solve this problem, CN102040683A discloses a method for preparing a carrier by means of a reaction of a magnesium halide alkoxide with an ethylene oxide compound. Specifically, it discloses melting and dispersing a magnesium halide alkoxide followed by adding an ethylene oxide compound, or melting and dispersing the magnesium halide alkoxide compound and then adding the melted and dispersed magnesium halide alkoxide compound directly to a reactor containing the ethylene oxide compound. This method for preparing a catalyst carrier however has disadvantages such as instable preparation process, easy adhesion among carrier particles, poor morphology of carrier particles, and a wide particle size distribution.

It is therefore of great significance to develop a new carrier for olefin polymerization catalyst that can overcome the above-mentioned defects in the existing technologies.

SUMMARY OF THE INVENTION

The inventor of the present invention unexpectedly found that the addition of sulfur during preparation of a carrier for an olefin polymerization catalyst can help to obtain a carrier with new composition. Particles of the obtained carrier are good in morphology and smooth at surface, and among them there are basically no non-spherical particles. Besides, the particle size of the carrier can be less than 20 microns, and the particle size distribution thereof is narrow. The catalyst prepared from the carrier has a relatively high activity and sensitive hydrogen response, and can increase bulk density of a polymer when used for olefin polymerization.

Based on the above, the present invention, in its first aspect, provides a carrier for an olefin polymerization catalyst. The carrier comprises a magnesium-containing compound and sulfur. The sulfur may be present in the carrier in form of an elemental sulfur, a complex, or a compound.

The present invention, in its second aspect, provides a method for preparing a carrier for an olefin polymerization catalyst. The method comprises the following steps. (1) A mixture is prepared. The mixture comprises an elemental sulfur and/or a sulfur-containing compound, a magnesium halide represented by a general formula $MgX_1Y$, a compound represented by a general formula $R_1OH$, an optional inert liquid medium, and an optional surfactant. Preferably, the mixture is obtained by mixing and heating the elemental sulfur and/or the sulfur-containing compound, the magnesium halide represented by the general formula $MgX_1Y$, the compound represented by the general formula $R_1OH$, the optional inert liquid medium, and the optional surfactant together.

(2) The mixture obtained in step (1) is contacted and reacted with an ethylene oxide compound.

In the general formula $MgX_1Y$, X1 is halogen, preferably chlorine or bromine; Y is selected from a group consisting of halogen, substituted or unsubstituted $C_1$-$C_{10}$ linear alkyl, substituted or unsubstituted $C_3$-$C_{10}$ branched alkyl, substituted or unsubstituted $C_3$-$C_{10}$ cycloalkyl, substituted or unsubstituted $C_6$-$C_{20}$ aryl, substituted or unsubstituted $C_1$-$C_{10}$ alkoxy, substituted or unsubstituted $C_6$-$C_{20}$ aryloxy, substituted or unsubstituted $C_7$-$C_{20}$ aralkyl, and substituted or unsubstituted $C_7$-$C_{20}$ alkaryl.

In the general formula $R_1OH$, $R_1$ is selected from a group consisting of substituted or unsubstituted $C_1$-$C_{10}$ linear alkyl, substituted or unsubstituted $C_3$-$C_{10}$ branched alkyl, substituted or unsubstituted $C_3$-$C_{10}$ cycloalkyl, substituted or unsubstituted $C_6$-$C_{20}$ aryl, substituted or unsubstituted $C_7$-$C_{20}$ aralkyl, and substituted or unsubstituted $C_7$-$C_{20}$ alkaryl; preferably, $R_1$ is selected from a group consisting of substituted or unsubstituted $C_1$-$C_8$ linear alkyl, substituted or unsubstituted $C_3$-$C_8$ branched alkyl, substituted or unsubstituted $C_3$-$C_8$ cycloalkyl, substituted or unsubstituted $C_6$-$C_{15}$ aryl, substituted or unsubstituted $C_7$-$C_{15}$ aralkyl, and substituted or unsubstituted $C_7$-$C_{15}$ alkaryl; more preferably, $R_1$ is selected from a group consisting of substituted or unsubstituted $C_1$-$C_6$ linear alkyl, substituted or unsubstituted $C_3$-$C_6$ branched alkyl, substituted or unsubstituted $C_3$-$C_6$ cycloalkyl, substituted or unsubstituted $C_6$-$C_{10}$ aryl, substituted or unsubstituted $C_7$-$C_{10}$ aralkyl, and substituted or unsubstituted $C_7$-$C_{10}$ alkaryl.

The ethylene oxide compound has a structure shown in Formula (II).

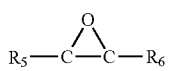

(II)

In Formula (II), $R_5$ and $R_6$ are each independently selected from a group consisting of hydrogen, substituted or unsubstituted $C_1$-$C_{10}$ linear alkyl, substituted or unsubstituted $C_3$-$C_{10}$ branched alkyl, substituted or unsubstituted $C_3$-$C_{10}$ cycloalkyl, substituted or unsubstituted $C_6$-$C_{20}$ aryl, substituted or unsubstituted $C_7$-$C_{20}$ aralkyl, and substituted or unsubstituted $C_7$-$C_{20}$ alkaryl; preferably, $R_5$ and $R_6$ are each independently selected from a group consisting of hydrogen, substituted or unsubstituted $C_1$-$C_8$ linear alkyl, substituted or unsubstituted $C_3$-$C_8$ branched alkyl, substituted or unsubstituted $C_3$-$C_8$ cycloalkyl, substituted or unsubstituted $C_6$-$C_{10}$ aryl, substituted or unsubstituted $C_7$-$C_{10}$ aralkyl, and substituted or unsubstituted $C_7$-$C_{10}$ alkaryl; more preferably, $R_5$ and $R_6$ are each independently selected from a group consisting of hydrogen, substituted or unsubstituted $C_1$-$C_6$ linear alkyl, substituted or unsubstituted $C_3$-$C_6$ branched alkyl, substituted or unsubstituted $C_3$-$C_6$ cycloalkyl, substituted or unsubstituted $C_6$-$C_8$ aryl, substituted or unsubstituted $C_7$-$C_9$ aralkyl, and substituted or unsubstituted $C_7$-$C_9$ alkaryl.

The present invention, in its third aspect, provides a catalyst component for olefin polymerization. The catalyst component comprises the carrier according to the first aspect of the present invention and/or a carrier prepared by the method according to the second aspect of the present invention, titanium, and an optional electron donor, and/or comprises a reaction product resulted from a reaction of the carrier according to the first aspect of the present invention and/or a carrier prepared by the method according to the second aspect of the present invention with a titanium compound and an optional electron donor.

The present invention, in its fourth aspect, provides use of the carrier according to the first aspect of the present invention and/or a carrier prepared by the method according to the second aspect of the present invention and/or the catalyst component according to the third aspect of the present invention in preparation of a catalyst for olefin polymerization.

The present invention, in its fifth aspect, provides a catalyst for olefin polymerization. The catalyst comprises: (1) the catalyst component according to the third aspect of the present invention; (2) an alkyl aluminum compound; and (3) an optional external electron donor compound.

The present invention, in its sixth aspect, provides an olefin polymerization method. The method comprises: contacting one or more olefins with the above catalyst of the present invention under olefin polymerization conditions.

BRIEF DESCRIPTION OF THE DRAWINGS

Exemplary embodiments of the present invention will be described in more detail with reference to the accompanying drawings.

DETAILED DESCRIPTION OF THE EMBODIMENTS

Figure 1:
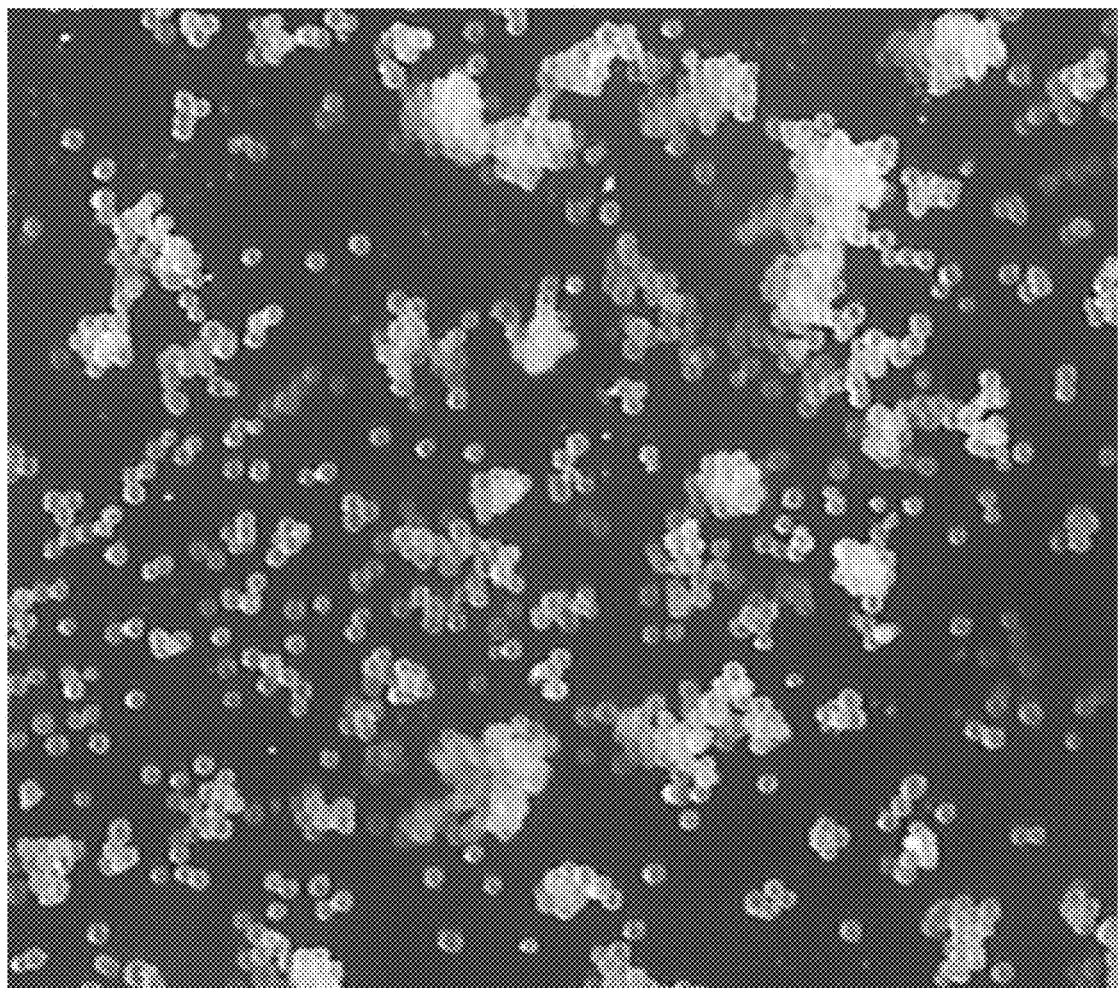
FIG. 1 is an optical microscope photograph of a spherical carrier for an olefin polymerization catalyst prepared in Preparation Example 1.

The present invention, in its first aspect, provides a carrier for an olefin polymerization catalyst. The carrier comprises a magnesium-containing compound and sulfur. The sulfur may be present in the carrier in form of an elemental sulfur, a complex, or a compound.

According to some embodiments of the present invention, the magnesium-containing compound has one or more groups selected from halogen, substituted or unsubstituted alkyl, substituted or unsubstituted aryl, substituted or unsubstituted alkoxy, and substituted or unsubstituted aryloxy.

According to some embodiments of the present invention, a molar ratio of magnesium in the magnesium-containing compound to the sulfur is 1:q, where $0<q\le0.5$, preferably $0.0001<q\le0.3$, more preferably $0.001<q\le0.1$.

According to some embodiments of the present invention, the magnesium-containing compound has one or more groups selected from halogen, $C_1$-$C_{10}$ linear alkyl, substituted or unsubstituted $C_3$-$C_{10}$ branched alkyl, substituted or unsubstituted $C_3$-$C_{10}$ cycloalkyl, substituted or unsubstituted $C_6$-$C_{20}$ aryl, substituted or unsubstituted $C_1$-$C_{10}$ alkoxy, substituted or unsubstituted $C_6$-$C_{20}$ aryloxy, substituted or unsubstituted $C_7$-$C_{20}$ aralkyl, and substituted or unsubstituted $C_7$-$C_{20}$ alkaryl.

According to some embodiments of the present invention, the magnesium-containing compound is selected from magnesium compounds represented by Formula (I).

(I)

In Formula (I), $R_1$ is selected from a group consisting of substituted or unsubstituted $C_1$-$C_{10}$ linear alkyl, substituted or unsubstituted $C_3$-$C_{10}$ branched alkyl, substituted or unsubstituted $C_3$-$C_{10}$ cycloalkyl, substituted or unsubstituted $C_6$-$C_{20}$ aryl, substituted or unsubstituted $C_7$-$C_{20}$ aralkyl, and substituted or unsubstituted $C_7$-$C_{20}$ alkaryl; preferably, $R_1$ is selected from a group consisting of substituted or unsubstituted $C_1$-$C_8$ linear alkyl, substituted or unsubstituted $C_3$-$C_8$ branched alkyl, substituted or unsubstituted $C_3$-$C_8$ cycloalkyl, substituted or unsubstituted $C_6$-$C_{15}$ aryl, substituted or unsubstituted $C_7$-$C_{15}$ aralkyl, and substituted or unsubstituted $C_7$-$C_{15}$ is alkaryl; more preferably, $R_1$ is selected from a group consisting of substituted or unsubstituted $C_1$-$C_6$ linear alkyl, substituted or unsubstituted $C_3$-$C_6$ branched alkyl, substituted or unsubstituted $C_3$-$C_6$ cycloalkyl, substituted or unsubstituted $C_6$-$C_{10}$ aryl, substituted or unsubstituted $C_7$-$C_{10}$ aralkyl, and substituted or unsubstituted $C_7$-$C_{10}$ alkaryl.

$R_2$ and $R_3$ are identical to or different from each other, each independently selected from a group consisting of hydrogen, substituted or unsubstituted $C_1$-$C_{10}$ linear alkyl, substituted or unsubstituted $C_3$-$C_{10}$ branched alkyl, substituted or unsubstituted $C_3$-$C_{10}$ cycloalkyl, substituted or unsubstituted $C_6$-$C_{20}$ aryl, substituted or unsubstituted $C_7$-$C_{20}$ aralkyl, and substituted or unsubstituted $C_7$-$C_{20}$ alkaryl; preferably, $R_2$ and $R_3$ are each independently selected from a group consisting of hydrogen, substituted or unsubstituted $C_1$-$C_{10}$ linear alkyl, substituted or unsubstituted $C_3$-$C_8$ branched alkyl, substituted or unsubstituted $C_3$-$C_8$ cycloalkyl, substituted or unsubstituted $C_6$-$C_{10}$ aryl, substituted or unsubstituted $C_7$-$C_{10}$ aralkyl, and substituted or unsubstituted $C_7$-$C_{10}$ alkaryl; more preferably, $R_2$ and $R_3$ are each independently selected from a group consisting of hydrogen, substituted or unsubstituted $C_1$-$C_6$ linear alkyl, substituted or unsubstituted $C_3$-$C_6$ branched alkyl, substituted or unsubstituted $C_3$-$C_6$ cycloalkyl, substituted or unsubstituted $C_6$-$C_8$ aryl, substituted or unsubstituted $C_7$-$C_9$ aralkyl, and substituted or unsubstituted $C_7$-$C_9$ alkylaryl.

X is halogen, preferably chlorine or bromine.

m is 0.1-1.9; n is 0.1-1.9; and m+n=2.

According to some embodiments of the present invention, the carrier is spherical or quasi-spherical. An average particle size of the carrier for an olefin polymerization catalyst of the present invention may be controlled within a wide range, for example, within a range of 10-100 microns. According to a preferred embodiment of the present invention, an average particle diameter (D50) of the spherical carrier for an olefin polymerization catalyst of the present invention may be controlled to be less than or equal to 30 microns, preferably less than or equal to 20 microns. In this preferred embodiment, a catalyst prepared from the spherical carrier for an olefin polymerization catalyst can help to obtain an olefin polymer having a higher bulk density. In the present invention, the average particle diameter and a particle size distribution of the spherical carrier for an olefin polymerization catalyst may be measured with a particle size analyzer namely Master Sizer 2000 laser (manufactured by Malvern Instruments Ltd.). According to some embodiments of the present invention, the average particle diameter of the carrier is less than or equal to 30 microns, preferably less than or equal to 20 microns. According to some embodiments of the present invention, the particle size distribution (D90-D10)/D50) is less than 1.2, preferably less than or equal to 0.8.

According to some embodiments of the present invention, raw materials for synthesizing the carrier comprise an elemental sulfur and/or a sulfur-containing compound, a magnesium halide represented by a general formula $MgX_1Y$, a compound represented by a general formula $R_4OH$, and ethylene oxide compound.

According to some embodiments of the present invention, in the general formula $MgX_1Y$, $X_1$ is halogen, preferably chlorine or bromine; Y is selected from a group consisting of halogen, substituted or unsubstituted $C_1$-$C_{10}$ linear alkyl, substituted or unsubstituted $C_3$-$C_{10}$ branched alkyl, substituted or unsubstituted $C_3$-$C_{10}$ cycloalkyl, substituted or unsubstituted $C_6$-$C_{20}$ aryl, substituted or unsubstituted $C_1$-$C_{10}$ alkoxy, substituted or unsubstituted $C_6$-$C_{20}$ aryloxy, substituted or unsubstituted $C_7$-$C_{20}$ aralkyl, and substituted or unsubstituted $C_7$-$C_{20}$ alkaryl.

According to some embodiments of the present invention, in the general formula $R_1OH$, $R_1$ is selected from a group consisting of substituted or unsubstituted $C_1$-$C_{10}$ linear alkyl, substituted or unsubstituted $C_3$-$C_{10}$ branched alkyl, substituted or unsubstituted $C_3$-$C_{10}$ cycloalkyl, substituted or unsubstituted $C_6$-$C_{20}$ aryl, substituted or unsubstituted $C_7$-$C_{20}$ aralkyl, and substituted or unsubstituted $C_7$-$C_{20}$ alkaryl; preferably, $R_1$ is selected from a group consisting of substituted or unsubstituted $C_1$-$C_8$ linear alkyl, substituted or unsubstituted $C_3$-$C_8$ branched alkyl, substituted or unsubstituted $C_3$-$C_8$ cycloalkyl, substituted or unsubstituted $C_7$-$C_{15}$ aryl, substituted or unsubstituted $C_7$-$C_{15}$ aralkyl, and substituted or unsubstituted $C_7$-$C_{15}$ is alkaryl; more preferably, $R_1$ is selected from a group consisting of substituted or unsubstituted $C_1$-$C_6$, linear alkyl, substituted or unsubstituted $C_3$-$C_6$ branched alkyl, substituted or unsubstituted $C_3$-$C_6$ cycloalkyl, substituted or unsubstituted $C_6$-$C_{10}$ aryl, substituted or unsubstituted $C_7$-$C_{10}$ aralkyl, and substituted or unsubstituted $C_7$-$C_{10}$ alkaryl.

According to some embodiments of the present invention, the ethylene oxide compound has a structure shown in Formula (II).

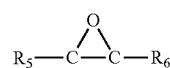

(II)

In Formula (II), $R_5$ and $R_6$ are each independently selected from a group consisting of hydrogen, substituted or unsubstituted $C_1$-$C_{10}$ linear alkyl, substituted or unsubstituted $C_3$-$C_{10}$ branched alkyl, substituted or unsubstituted $C_3$-$C_{10}$ cycloalkyl, substituted or unsubstituted $C_6$-$C_{20}$ aryl, substituted or unsubstituted $C_7$-$C_{20}$ aralkyl, and substituted or unsubstituted $C_7$-$C_{20}$ alkaryl; preferably, $R_5$ and $R_6$ are each independently selected from a group consisting of hydrogen, substituted or unsubstituted $C_1$-$C_8$ linear alkyl, substituted or unsubstituted $C_3$-$C_8$ branched alkyl, substituted or unsubstituted $C_3$-$C_8$ cycloalkyl, substituted or unsubstituted $C_6$-$C_{10}$ aryl, substituted or unsubstituted $C_7$-$C_{10}$ aralkyl, and substituted or unsubstituted $C_7$-$C_{10}$ alkaryl; more preferably, $R_5$ and $R_6$ are each independently selected from a group consisting of hydrogen, substituted or unsubstituted $C_1$-$C_6$ linear alkyl, substituted or unsubstituted $C_3$-$C_6$ branched alkyl, substituted or unsubstituted $C_3$-$C_6$ cycloalkyl, substituted or unsubstituted $C_6$-$C_8$ aryl, substituted or unsubstituted $C_7$-$C_9$ aralkyl, and substituted or unsubstituted $C_7$-$C_9$ alkaryl.

According to some embodiments of the present invention, in the general formula $MgX_1Y$, $X_1$ is chlorine or bromine, and Y is chlorine, bromine, $C_1$-$C_5$ alkoxy or $C_6$-$C_{10}$ aryloxy. Preferably, the magnesium halide represented by the general formula $MgX_1Y$ is at least one selected from magnesium chloride, magnesium bromide, phenoxymagnesium chloride, isopropoxymagnesium chloride, and n-butoxymagnesium chloride.

According to some embodiments of the present invention, in the general formula $R_1OH$, $R_1$ is $C_1$-$C_8$ alkyl. Preferably, the compound represented by the general formula $R_1OH$ is at least one selected from ethanol, n-propanol, isopropanol, n-butanol, isobutanol, n-pentanol, isopentanol, n-hexanol, 2-ethylhexanol, and n-octanol.

According to some embodiments of the present invention, in the ethylene oxide compound having the structure represented by Formula (II), $R_5$ and $R_6$ are each independently hydrogen, $C_1$-$C_3$ alkyl, or $C_1$-$C_3$ halogenated alkyl. Preferably, the ethylene oxide compound is at least one selected from a group consisting of ethylene oxide, epoxypropane, epoxybutane, epoxychloropropane, epoxychlorobutane, epoxybromopropane, and epoxybromobutane.

According to the present invention, the carrier for an olefin polymerization catalyst may contain water coming from a trace of water carried by the raw materials for synthesizing the carrier and a reaction medium.

The present invention, in its second aspect, provides a method for preparing a carrier for an olefin polymerization catalyst. The method comprises the following steps.

(1) A mixture is prepared. The mixture comprises an elemental sulfur and/or a sulfur-containing compound, a magnesium halide represented by a general formula $MgX_1Y$, a compound represented by a general formula $R_1OH$, an optional inert liquid medium, and an optional surfactant. Preferably, the mixture is obtained by mixing the elemental sulfur and/or the sulfur-containing compound, the magnesium halide represented by the general formula $MgX_1Y$, the compound represented by the general formula $R_1OH$, the optional inert liquid medium, and the optional surfactant together at one time or step by step and then heating a resulting mixture.

(2) The mixture obtained in step (1) is contacted and reacted with an ethylene oxide compound.

In the general formula $MgX_1Y$, X1 is halogen, preferably chlorine or bromine; Y is selected from a group consisting of halogen, substituted or unsubstituted $C_1$-$C_{10}$ linear alkyl, substituted or unsubstituted $C_3$-$C_{10}$ branched alkyl, substituted or unsubstituted $C_3$-$C_{10}$ cycloalkyl, substituted or unsubstituted $C_6$-$C_{20}$ aryl, substituted or unsubstituted $C_1$-$C_{10}$ alkoxy, substituted or unsubstituted $C_6$-$C_{20}$ aryloxy, substituted or unsubstituted $C_7$-$C_{20}$ aralkyl, and substituted or unsubstituted $C_7$-$C_{20}$ alkaryl.

In the general formula $R_1OH$, $R_1$ is selected from a group consisting of substituted or unsubstituted $C_1$-$C_{10}$ linear alkyl, substituted or unsubstituted $C_3$-$C_{10}$ branched alkyl, substituted or unsubstituted $C_3$-$C_{10}$ cycloalkyl, substituted or unsubstituted $C_6$-$C_{20}$ aryl, substituted or unsubstituted $C_7$-$C_{20}$ aralkyl, and substituted or unsubstituted $C_7$-$C_{20}$ alkaryl; preferably, $R_1$ is selected from a group consisting of substituted or unsubstituted $C_1$-$C_8$ linear alkyl, substituted or unsubstituted $C_3$-$C_8$ branched alkyl, substituted or unsubstituted $C_3$-$C_8$ cycloalkyl, substituted or unsubstituted $C_7$-$C_{15}$ aryl, substituted or unsubstituted $C_7$-$C_{15}$ aralkyl, and substituted or unsubstituted $C_7$-$C_{15}$ alkaryl; more preferably, $R_1$ is selected from a group consisting of substituted or unsubstituted $C_1$-$C_6$ linear alkyl, substituted or unsubstituted $C_3$-$C_6$ branched alkyl, substituted or unsubstituted $C_3$-$C_6$ cycloalkyl, substituted or unsubstituted $C_6$-$C_{10}$ aryl, substituted or unsubstituted $C_7$-$C_{10}$ aralkyl, and substituted or unsubstituted $C_7$-$C_{10}$ alkaryl.

The ethylene oxide compound has a structure shown in Formula (II).

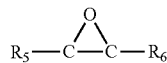

(II)

In Formula (II), $R_5$ and $R_6$ are each independently selected from a group consisting of hydrogen, substituted or unsubstituted $C_1$-$C_{10}$ linear alkyl, substituted or unsubstituted $C_3$-$C_{10}$ branched alkyl, substituted or unsubstituted $C_3$-$C_{10}$ cycloalkyl, substituted or unsubstituted $C_6$-$C_{20}$ aryl, substituted or unsubstituted $C_7$-$C_{20}$ aralkyl, and substituted or unsubstituted $C_7$-$C_{20}$ alkaryl; preferably, $R_5$ and $R_6$ are each independently selected from a group consisting of hydrogen, substituted or unsubstituted $C_1$-$C_8$ linear alkyl, substituted or unsubstituted $C_3$-$C_8$ branched alkyl, substituted or unsubstituted $C_3$-$C_8$ cycloalkyl, substituted or unsubstituted $C_6$-$C_{10}$ aryl, substituted or unsubstituted $C_7$-$C_{10}$ aralkyl, and substituted or unsubstituted $C_7$-$C_{10}$ alkaryl; more preferably, $R_5$ and $R_6$ are each independently selected from a group consisting of hydrogen, substituted or unsubstituted $C_1$-$C_6$ linear alkyl, substituted or unsubstituted $C_3$-$C_6$ branched alkyl, substituted or unsubstituted $C_3$-$C_6$ cycloalkyl, substituted or unsubstituted $C_6$-$C_8$ aryl, substituted or unsubstituted $C_7$-$C_9$ aralkyl, and substituted or unsubstituted $C_7$-$C_9$ alkaryl.

According to some embodiments of the present invention, in the general formula $MgX_1Y$, $X_1$ is chlorine or bromine, and Y is chlorine, bromine, $C_1$-C5 alkoxy or $C_6$-$C_{10}$ aryloxy. Preferably, the magnesium halide represented by the general formula $MgX_1Y$ is at least one selected from magnesium chloride, magnesium bromide, phenoxymagnesium chloride, isopropoxymagnesium chloride, and n-butoxymagnesium chloride.

According to some embodiments of the present invention, in the general formula $R_1OH$, $R_1$ is $C_1$-$C_8$ alkyl. Preferably, the compound represented by the general formula $R_1OH$ is at least one selected from ethanol, n-propanol, isopropanol, n-butanol, isobutanol, n-pentanol, isopentanol, n-hexanol, 2-ethylhexanol, and n-octanol.

According to some embodiments of the present invention, in the ethylene oxide compound having the structure represented by Formula (II), $R_5$ and $R_6$ are each independently hydrogen, $C_1$-$C_3$ alkyl, or $C_1$-$C_3$ halogenated alkyl. Preferably, the ethylene oxide compound is at least one selected from a group consisting of ethylene oxide, epoxypropane, epoxybutane, epoxychloropropane, epoxychlorobutane, epoxybromopropane, and epoxybromobutane.

According to some embodiments of the present invention, based on 1 mol of the magnesium halide represented by the general formula $MgX_1Y$, the elemental sulfur and/or the sulfur-containing compound is present in an amount of 0.0001-0.5 mol; the compound represented by the general formula $R_1OH$ is present in an amount of 4-30 mol; and the ethylene oxide compound is present in an amount of 1-10 mol.

Preferably, based on 1 mol of the magnesium halide represented by the general formula $MgX_1Y$, the compound represented by the general formula $R_1OH$ is present in an amount of 6-20 mol, and the ethylene oxide compound is present in an amount of 2-6 mol.

According to some embodiments of the present invention, in step (1), the heating is conducted at a temperature of 80-120° C. for a time period of 0.5-5 hours, preferably at a temperature of 80-100° C. for a time period of 0.5-3 hours.

According to some embodiments of the present invention, in step (2), the contacting and reacting the mixture obtained in step (1) with the ethylene oxide compound is conducted at conditions of a temperature of 40-120° C. for a time period of 15-60 minutes, preferably of a temperature of 60-100° C. for a time period of 20-50 minutes.

According to some embodiments of the present invention, the inert liquid medium is a silicone oil solvent and/or a hydrocarbon solvent. Preferably, the inert liquid medium is at least one selected from a group consisting of kerosene, paraffin oil, petrolatum oil, white oil, methyl silicone oil, ethyl silicone oil, methyl ethyl silicone oil, phenyl silicone oil, and methyl phenyl silicone.

According to some embodiments of the present invention, based on 1 mol of the magnesium halide represented by the general formula $MgX_1Y$, the inert liquid medium is present in an amount of 0.8-10 L.

According to some embodiments of the present invention, the surfactant is at least one selected from a group consisting of polyvinylpyrrolidone, polyethylene glycol, polyvinyl alcohol, polyacrylic acid, polyacrylate, polyacrylamide, polystyrene sulfonate, naphthalenesulfonic acid formaldehyde condensate, condensed alkyl phenyl ether sulfate, condensed alkyl phenol polyoxyethylene ether phosphate, oxyalkyl acrylate copolymer modified polyethyleneimine, 1-dodeca-4-vinylpyridine bromide polymer, polyvinylbenzyltrimethylamine salt, polyethylene oxide propylene oxide block copolymer, polyvinylpyrrolidone vinyl acetate copolymer, alkyl phenyl polyoxyethylene ether, and polyalkyl methacrylate.

According to some embodiments of the present invention, based on 1 mol of the magnesium halide represented by the general formula $MgX_1Y$, the surfactant is present in an amount of 1-20 g.

According to some embodiments of the present invention, the elemental sulfur is at least one selected from α-sulfur, β-sulfur, γ-sulfur, and polymeric sulfur.

According to some embodiments of the present invention, the sulfur-containing compound has one or more groups selected from a mercapto group (—SH), a thioether group (—S—), and thiocarbonyl

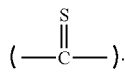

Examples of the sulfur-containing compound include 2-mercaptoethanol, tetramethylthiuram monosulfide, tetramethylthiuram disulfide, etc.

According to the present invention, the method may further include subjecting a product obtained from the contacting and reacting the mixture obtained in step (1) with the ethylene oxide compound to solid-liquid separation, and washing and drying a solid phase product obtained from the separation. The solid-liquid separation may be realized by any existing method capable of separating a solid phase from a liquid phase, such as suction filtration, filter pressing, or centrifugal separation. Preferably, the method for the solid-liquid separation is filter pressing. Conditions for the filter pressing are not specifically limited in the present invention so long as a solid phase and a liquid phase can be separated as fully as possible. The washing may be realized by a method well known to those skilled in the art which can be used to wash the obtained solid phase product. For example, an inert hydrocarbon solvent (such as pentane, hexane, heptane, petroleum ether, and gasoline) can be used to wash the obtained solid phase product. Conditions for the drying are not specifically limited in the present invention. For example, the drying may be conducted at a temperature of 20-70° C. for a time period of 0.5-10 hours. According to the present invention, the drying can be conducted at a normal pressure or a reduced pressure.

According to the technical solution of the present invention, the addition of sulfur during the preparation of the carrier for an olefin polymerization catalyst can help to obtain a spherical carrier with a novel composition. Sulfur can reduce collision probability among unshaped particles and reduce adhesion among carrier particles, so that resulting carrier particles have a small particle size, a narrow particle size distribution, and good morphology. A catalyst prepared using this carrier has a narrow particle size distribution, a good activity, sensitive hydrogen response, and can increase bulk density of a polymer when used in olefin polymerization.

The present invention, in its third aspect, provides a catalyst component for olefin polymerization. The catalyst component comprises the carrier according to the first aspect of the present invention and/or a carrier prepared by the method according to the second aspect of the present invention, titanium, and an optional electron donor, and/or comprises a reaction product resulted from a reaction of the carrier according to the first aspect of the present invention and/or a carrier prepared by the method according to the second aspect of the present invention with a titanium compound and an optional electron donor.

According to some embodiments of the present invention, the catalyst component is spherical or quasi-spherical, and has an average particle diameter less than or equal to 30 microns, preferably less than or equal to 20 microns.

According to some embodiments of the present invention, the catalyst component is spherical or quasi-spherical, and has a particle size distribution of less than 1.2, preferably less than or equal to 0.8.

In the present invention, the titanium compound may be a titanium compound commonly used in the art. Preferably, the titanium compound is a compound represented by Formula XI and/or Formula XI.

$$TiX_p(OR_{27})_{4-p}$$  Formula XI $$TiX_q(OR_{28})_{3-q}$$  Formula XII In Formula XI and Formula XII, X is halogen; $R_{27}$ and $R_{28}$ are each independently $C_1$-$C_{20}$ alkyl; p is an integer from 1 to 4; and q is an integer from 1 to 3.

More preferably, the titanium compound is one or more selected from a group consisting of titanium tetrachloride, titanium tetrabromide, titanium tetraiodide, tributoxy titanium chloride, dibutoxy titanium dichloride, butoxy titanium trichloride, triethoxy titanium chloride, diethoxy titanium di chloride, ethoxy titanium trichloride, and titanium trichloride. Most preferably, the titanium compound is titanium tetrachloride A method for preparing the catalyst component for olefin polymerization of the present invention may include the following steps. A magnesium compound and a titanium compound are subjected to a reaction. In one or more time periods before, during, and after the reaction of the magnesium compound with the titanium compound, an internal electron donor is added.

The present invention, in its fourth aspect, provides use of the carrier according to the first aspect of the present invention and/or a carrier prepared by the method according to the second aspect of the present invention and/or the catalyst component according to the third aspect of the present invention in preparation of a catalyst for olefin polymerization.

The present invention, in its fifth aspect, provides a catalyst for olefin polymerization. The catalyst comprises: (1) the catalyst component according to the third aspect of the present invention; (2) an alkyl aluminum compound; and (3) an optional external electron donor compound.

According to the present invention, in the above catalyst for olefin polymerization, the alkyl aluminum compound may be any alkyl aluminum compound commonly used in the field of olefin polymerization that can be used as a co-catalyst for an olefin polymerization catalyst. Preferably, the alkyl aluminum compound is a compound represented by Formula XIII $$AlR'_{n}X'_{3-n'}$$  Formula XIII In Formula XIII, R' is $C_1$-$C_8$ alkyl or halogenated alkyl; X' is halogen, preferably one or more selected from chlorine, bromine, and iodine, more preferably chlorine; and n' is an integer from 1 to 3.

More preferably, the alkyl aluminum compound is one or more selected from a group consisting of triethyl aluminum, tripropyl aluminum, tri-n-butyl aluminum, tri-isobutyl aluminum, tri-n-hexyl aluminum, tri-n-octyl aluminum, tri-isobutyl aluminum, diethyl aluminum monohydrogen, diisobutyl aluminum monohydrogen, diethyl aluminum chloride, diisobutyl aluminum chloride, ethyl aluminum dichloride, $Al(n-C_6H_{13})_3$, and $Al(n-C_8H_{17})_3$.

Most preferably, the alkyl aluminum compound is triethyl aluminum and/or triisobutyl aluminum.

According to the present invention, an amount of the alkyl aluminum compound may be a conventional amount in the art. Preferably, a molar ratio of aluminum in the alkyl aluminum compound to titanium in the catalyst component is (1-2000):1. More preferably, the molar ratio of aluminum in the alkyl aluminum compound to titanium in the catalyst component is (10-500):1.

In the present invention, a type and a content of the external electron donor in the catalyst for olefin polymerization are not particularly limited. Preferably, a molar ratio of aluminum in the alkyl aluminum compound to the external electron donor compound is (2-200):1, more preferably (2.5-100):1.

According to the present invention, the use of the external electron donor compound in combination with the internal electron donor compound a and the internal electron donor compound b can further increase the isotactic index of an olefin polymer obtained by the method of the present invention. The external electron donor compound may be any external electron donor compound commonly used in the art that can achieve the above purpose, and may be, for example, one or more selected from carboxylic acid, carboxylic acid anhydride, carboxylic acid ester, ketone, ether, alcohol, lactone, and organophosphorus compounds, and organosilicon compounds. Preferably, the external electron donor compound is an organosilicon compound represented by Formula XIV.

$$(R_{29})_{m'}(R_{30})_{p'}Si(OR_{31})_{q'}$$  Formula XIV

In Formula XIV, $R_{29}$, $R_{30}$, and $R_{31}$ are each independently $C_1$-$C_{18}$ hydrocarbyl, and each optionally contain heteroatoms, the heteroatoms being one or more of F, Cl, Br, N, and I; m' and p' are each independently an integer from 0 to 2; q' is an integer from 1 to 3; and a sum of m', p', and q' is 4.

Preferably, $R_{29}$ and $R_{30}$ are each independently $C_3$-$C_{10}$ linear or branched alkyl, $C_3$-$C_{10}$ linear or branched alkenyl, substituted or unsubstituted $C_3$-$C_{10}$ alkylene, substituted or unsubstituted $C_3$-$C_{10}$ cycloalkyl, and substituted or unsubstituted $C_6$-$C_{10}$ aryl, and each optionally containing heteroatoms, the heteroatoms being one or more of F, Cl, Br, N, and I; $R_{31}$ is $C_1$-$C_{10}$ linear or branched alkyl, more preferably methyl.

According to the present invention, specific examples of the external electron donor compound may include but are not limited to: cyclohexylmethyldimethoxysilane, diisopropyldimethoxysilane, di-n-butyldimethoxysilane, diisobutyldimethoxysilane, diphenyldimethoxysilane, methyl-tert-butyldimethoxysilane, cyclohexyltrimethoxysilane, tert-butyltrimethoxysilane, tert-hexyltrimethoxysilanesilane, dicyclopentyldimethoxysilane, 2-ethylpiperidinyl-2-tert-butyldimethoxysilane, (1,1,1-trifluoro-2-propyl)-2-ethylpiperidinyldimethoxysilane, and (1,1,1-trifluoro-2-propyl)-methyldimethoxysilane. These external electron donors can be used alone or in combinations.

More preferably, the external electron donor compound is cyclohexylmethyldimethoxysilane and/or dicyclopentyldimethoxysilane.

According to the present invention, during the preparation of the catalyst for olefin polymerization, the alkyl aluminum and the optional external electron donor compound may be mixed and reacted respectively with the catalyst component for olefin polymerization, or the alkyl aluminum and the optional external electron donor compound may be mixed first and then mixed and reacted with the catalyst component for olefin polymerization.

According to the present invention, when the catalyst for olefin polymerization is used in polymerization of an olefin, the catalyst component for olefin polymerization, the alkyl aluminum, and the optional external electron donor may be separately added to a polymerization reactor, or may be mixed first and then added to the polymerization reactor, or may be added to the polymerization reactor after the olefin is pre-polymerized according to a pre-polymerization method known in the art.

The present invention, in its sixth aspect, provides an olefin polymerization method. The method comprises: contacting one or more olefins with the above-mentioned catalyst of the present invention under olefin polymerization conditions.

In some embodiments, the olefin is at least one olefin represented by a formula $CH_2=CHR$, where R is hydrogen or $C_1$-$C_6$ linear or branched alkyl. Specific examples of the olefin represented by the formula $CH_2=CHR$ may include: ethylene, propylene, 1-n-butene, 1-n-pentene, 1-n-hexene, 1-n-octene, and 4-methyl-1-pentene. Preferably, the olefin represented by the formula $CH_2=CHR$ is ethylene, propylene, 1-n-butene, 1-n-hexene, and 4-methyl-1-pentene. More preferably, the olefin represented by the formula $CH_2=CHR$ is propylene.

The olefin polymerization method of the present invention may be homopolymerization of a single olefin or copolymerization of a plurality of olefins.

According to the olefin polymerization method of the present invention, conditions for the olefin polymerization may be conventional conditions in the art. Generally, conditions for the olefin polymerization include a temperature of 0-150° C., a time period of 0.1-8 hours, and a pressure of 0.01-10 MPa. Preferably, conditions for the olefin polymerization include a temperature of 50-100° C., a time period of 0.5-3 hours, and a pressure of 0.5-5 MPa. An amount of the catalyst for olefin polymerization may be any conventional amount of an olefin catalyst in the existing technologies.

In the present invention, the elemental sulfur may be any subtype of elemental sulfur, including but not limited to at least one of α-sulfur, β-sulfur, γ-sulfur, and polymeric sulfur. The elemental sulfur may be anhydrous elemental sulfur or elemental sulfur containing bound water. The elemental sulfur may be commercially available.

In the present invention, halogen is selected from fluorine, chlorine, bromine, and iodine.

In the present invention, $C_1$-$C_{10}$ alkyl may be, for example, methyl, ethyl, n-propyl, isopropyl, n-butyl, sec-butyl, isobutyl, tert-butyl, n-pentyl, isopentyl, tert-pentyl, neopentyl, hexyl, isohexyl, heptyl, isoheptyl, octyl, or isooctyl.

In the present invention, $C_1$-$C_{10}$ alkoxy may be, for example, methoxy, ethoxy, propoxy, isopropoxy, butoxy, or isobutoxy.

In the present invention, $C_6$-$C_{10}$ aryl may be, for example, phenyl, o-tolyl, m-tolyl, p-tolyl, o-ethylphenyl, m-ethylphenyl, p-ethylphenyl, or naphthoxy.

In the present invention, $C_6$-$C_{10}$ aryloxy may be, for example, phenoxy or naphthoxy.

In the present invention, $C_3$-$C_8$ cycloalkyl may be, for example, cyclopentyl, cyclopentylmethyl, cyclopentylethyl, cyclohexyl, or cyclohexylmethyl.

In the present invention, the term "substituted" means that a described group can be substituted by one or more common substituents which can be alkyl, alkoxy, halogen, amino, hydroxyl, etc., such as $C_1$-$C_6$ alkyl, $C_1$-$C_6$ alkoxy, halogen, amino, hydroxyl, etc.

Specific embodiments of the present invention will be described in detail below. It should be appreciated that the specific embodiments described herein are only used to illustrate and explain, rather than limiting, the present invention.

The present invention will be described in detail below by way of embodiments.

In the examples and comparative examples:

1. Average particle diameter and particle size distribution of a spherical carrier for an olefin polymerization catalyst and a catalyst component were measured by a particle size analyzer namely Masters Sizer 2000 (manufactured by Malvern Instruments Ltd.).

2. Apparent morphology of a spherical carrier for an olefin polymerization catalyst was observed with an optical microscope namely Eclipse E200 purchased from Nikon.

3. Melt flow rate (MFR) was measured in accordance with ISO1133 at 230° C. at a load of 2.16 kg.

4. Bulk density of a polyolefin powder was measured by the method specified in GB/T 1636-2008.

Preparation Example 1

This preparation example is used to illustrate a spherical carrier for an olefin polymerization catalyst provided by the present invention and a preparation method thereof. 8.0 g (0.08 mol) of magnesium chloride, 56 mL (0.96 mol) of ethanol, 1 g (0.03 mol) of α-sulfur, and 1 g of PVP (polyvinylpyrrolidone) as a surfactant were added to a 0.6-L reactor, and heated under stirring to 90° C. A resulting mixture was subjected to a reaction at 90° C. for 2 hours, followed by adding 38 mL (0.48 mol) of epoxy chloropropane, and then again subjected to a reaction at 90° C. for 0.5 hour. After that, a resulting mixture was subjected to filter pressing. A product resulted from the filter pressing was washed with hexane five times. Finally, a resulting product was vacuum dried to obtain a spherical carrier Z1 for an olefin polymerization catalyst.

The spherical carrier Z1 for an olefin polymerization catalyst has an average particle diameter (D50) of 15 microns, and a particle size distribution ((D90–D10)/D50) of 0.6. As shown in FIG. 1, as it is observed through an optical microscope, particles of the spherical carrier Z1 for an olefin polymerization catalyst have relatively regular morphology and smooth surfaces, are basically all spherical, have a relatively narrow particle size distribution, and have basically no non-spherical particles.

According to gas chromatography-mass spectrometry, elemental analysis, and nuclear magnetic characterization, components of Z1 include a magnesium-containing compound represented by a structural formula

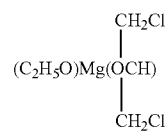

and sulfur. A molar ratio of magnesium in the magnesium-containing compound to the sulfur is 1:0.2.

Results shown in a hydrogen nuclear magnetic resonance spectrum (1-HNMR) are as follows.

| Group where a proton lies (group to which a proton belongs to) | Chemical shift, ppm | Integral area |
|---|---|---|
| CH₃ (ethyoxyl) | 1.42 | 3.1 |
| CH₂Cl (1,3-dichloropropoxy) | 3.86 | 4.31 |
| CH₂ (ethyoxyl) | 3.99 | 2.06 (8.99–6.93) |
| CHO (1,3-dichloropropoxy) | 4.38 | 1 |

Preparation Example 2

This preparation example is used to illustrate a spherical carrier for an olefin polymerization catalyst provided by the present invention and a preparation method thereof.

300 mL of white oil, 8.0 g (0.08 mol) of magnesium chloride, 28 mL (0.48 mol) of ethanol, 0.3 g (0.009 mol) of β-sulfur, and 1 g of PVP (polyvinylpyrrolidone) as a surfactant were added to a 0.6-L reactor, and heated under stirring to 100° C. A resulting mixture was subjected to a reaction at 100° C. for 1 hour, followed by adding 12.5 mL (0.16 mol) of epoxychloropropane, and then again subjected to a reaction at 100° C. for 20 minutes. After that, a resulting mixture was subjected to filter pressing. A product resulted from the filter pressing was washed with hexane five times. Finally, a resulting product was vacuum dried to obtain a spherical carrier Z2 for an olefin polymerization catalyst.

The spherical carrier Z2 for an olefin polymerization catalyst has an average particle diameter (D50) of 18 microns, and a particle size distribution ((D90–D10)/D50) of 0.7. As it is observed through an optical microscope, particles of the spherical carrier Z2 for an olefin polymerization catalyst have relatively regular morphology and smooth surfaces, are basically all spherical, have a relatively narrow particle size distribution, and have basically no non-spherical particles.

According to gas chromatography-mass spectrometry, elemental analysis, and nuclear magnetic characterization, components of Z2 include a magnesium-containing compound represented by a structural formula

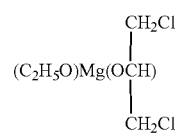

and sulfur. A molar ratio of magnesium in the magnesium-containing compound to the sulfur is 1:0.01.

Preparation Example 3

This preparation example is used to illustrate a spherical carrier for an olefin polymerization catalyst provided by the present invention and a preparation method thereof.

300 mL of white oil, 8.0 g (0.08 mol) of magnesium chloride, 28 mL (0.48 mol) of ethanol, 0.2 g (0.006 mol) of α-sulfur, and 1 g of PVP (polyvinylpyrrolidone) as a surfactant were added to a 0.6-L reactor, and heated under stirring to 100° C. A resulting mixture was subjected to a reaction at 100° C. for 1 hour, followed by adding 12.5 mL (0.16 mol) of epoxychloropropane, and then again subjected to a reaction at 100° C. for 20 minutes. After that, a resulting mixture was subjected to filter pressing. A product resulted from the filter pressing was washed with hexane five times. Finally, a resulting product was vacuum dried to obtain a spherical carrier Z3 for an olefin polymerization catalyst.

The spherical carrier Z3 for an olefin polymerization catalyst has an average particle diameter (D50) of 20 microns, and a particle size distribution ((D90–D10)/D50) of 0.8. As it is observed through an optical microscope, particles of the spherical carrier Z3 for an olefin polymerization catalyst have relatively regular morphology and smooth surfaces, are basically all spherical, have a relatively narrow particle size distribution, and have basically no non-spherical particles.

According to gas chromatography-mass spectrometry, elemental analysis, and nuclear magnetic characterization, components of Z3 include a magnesium-containing compound represented by a structural formula

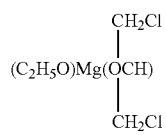

and sulfur. A molar ratio of magnesium in the magnesium-containing compound to the sulfur is 1:0.007.

Preparation Example 4

This preparation example is used to illustrate a spherical carrier for an olefin polymerization catalyst provided by the present invention and a preparation method thereof.

8.0 g (0.08 mol) of magnesium chloride, 59 mL (0.48 mol) of cyclohexane methanol, 0.3 g (0.009 mol) of β-sulfur, 1 g of PVP (polyvinylpyrrolidone) as a surfactant, were added to a 0.6-L reactor, and heated under stirring to 60° C. A resulting mixture was subjected to a reaction at 60° C. for 1 hour, followed by adding 12.5 mL (0.16 mol) of epoxychloropropane, and then again subjected to a reaction at 60° C. for 20 minutes. After that, a resulting mixture was subjected to filter pressing. A product resulted from the filter pressing was washed with hexane five times. Finally, a resulting product was vacuum dried to obtain a spherical carrier Z4 for an olefin polymerization catalyst.

The spherical carrier Z4 for an olefin polymerization catalyst has an average particle diameter (D50) of 25 microns, and a particle size distribution ((D90–D10)/D50) of 0.9. As it is observed through an optical microscope, particles of the spherical carrier Z4 for an olefin polymerization catalyst have relatively regular morphology and smooth surfaces, are basically all spherical, have a relatively narrow particle size distribution, and have basically no non-spherical particles.

According to gas chromatography-mass spectrometry, elemental analysis, and nuclear magnetic characterization, components of Z4 include a magnesium-containing compound represented by a structural formula

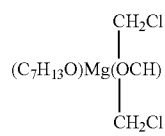

and sulfur. A molar ratio of magnesium in the magnesium-containing compound to the sulfur is 1:0.01.

Preparation Example 5

This preparation example is used to illustrate a spherical carrier for an olefin polymerization catalyst provided by the present invention and a preparation method thereof.

8.0 g (0.08 mol) of magnesium chloride, 28 mL (0.48 mol) of ethanol, 0.3 g (0.009 mol) of α-sulfur, and 1 g of PVP (polyvinylpyrrolidone) as a surfactant were added to a 0.6-L reactor, and heated under stirring to 70° C. A resulting mixture was subjected to a reaction at 70° C. for 1 hour, followed by adding 11.2 mL (0.16 mol) of epoxypropane, and then again subjected to a reaction at 70° C. for 20 minutes. After that, a resulting mixture was subjected to filter pressing. A product resulted from the filter pressing was washed with hexane five times. Finally, a resulting product was vacuum dried to obtain a spherical carrier Z5 for an olefin polymerization catalyst.

The spherical carrier Z5 for an olefin polymerization catalyst has an average particle diameter (D50) of 26 microns, and a particle size distribution ((D90–D10)/D50) of 0.9. As it is observed through an optical microscope, particles of the spherical carrier Z5 for an olefin polymerization catalyst have relatively regular morphology and smooth surfaces, are basically all spherical, have a relatively narrow particle size distribution, and have basically no non-spherical particles.

According to gas chromatography-mass spectrometry, elemental analysis, and nuclear magnetic characterization, components of Z5 include a magnesium-containing compound represented by a structural formula

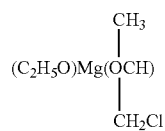

and sulfur. A molar ratio of magnesium in the magnesium-containing compound to the sulfur is 1:0.01.

Preparation Example 6

This preparation example is used to illustrate a spherical carrier for an olefin polymerization catalyst provided by the present invention and a preparation method thereof.

8.0 g (0.08 mol) of magnesium chloride, 28 mL (0.48 mol) of ethanol, 2 mL of 2-mercaptoethanol, 1 g of PVP (polyvinylpyrrolidone) as a surfactant were added to a 0.6-L reactor, and heated under stirring to 70° C. A resulting mixture was subjected to a reaction at 70° C. for 1 hour, followed by adding 11.2 mL (0.16 mol) of epoxypropane, and then again subjected to a reaction at 70° C. for 20 minutes. After that, a resulting mixture was subjected to filter pressing, A product resulted from the filter pressing was washed with hexane five times, Finally, a resulting product was vacuum dried to obtain a spherical carrier Z6 for an olefin polymerization catalyst.

Figure 2:
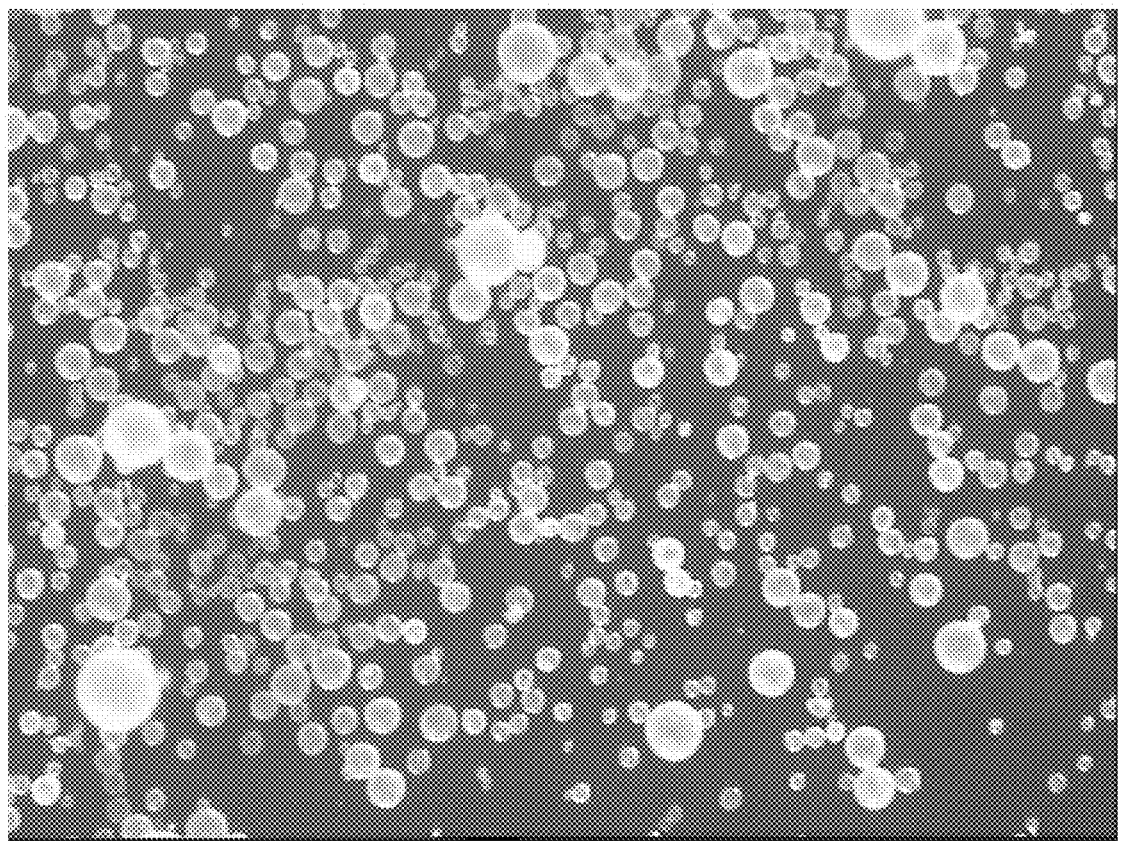
FIG. 2 is an optical microscope photograph of a spherical carrier for an olefin polymerization catalyst prepared in Preparation Example 6.

The spherical carrier Z6 for an olefin polymerization catalyst has an average particle diameter (D50) of 35.2 microns. As it is observed through an optical microscope, particles of the spherical carrier Z6 for an olefin polymerization catalyst have relatively regular morphology and smooth surfaces, are basically all spherical, have a relatively narrow particle size distribution, and have basically no non-spherical particles, as shown in FIG. 2.

Preparation Example 7

This preparation example is used to illustrate a spherical carrier for an olefin polymerization catalyst provided by the present invention and a preparation method thereof. 8.0 g (0.08 mol) of magnesium chloride, 28 mL (0.48 mol) of ethanol, 2 mL of tetramethylthiuram disulfide, 1 g of PVP (polyvinylpyrrolidone) as a surfactant were added to a 0.6-L reactor, and heated under stirring to 70° C. A resulting mixture was subjected to a reaction at 70° C. for 1 hour, followed by adding 11.2 mL (0.16 mol) of epoxypropane, and then again subjected to a reaction at 70° C. for 20 minutes. After that, a resulting mixture was subjected to filter pressing. A product resulted from the filter pressing was washed with hexane five times. Finally, a resulting product was vacuum dried to obtain a spherical carrier Z7 for an olefin polymerization catalyst.

Figure 3:
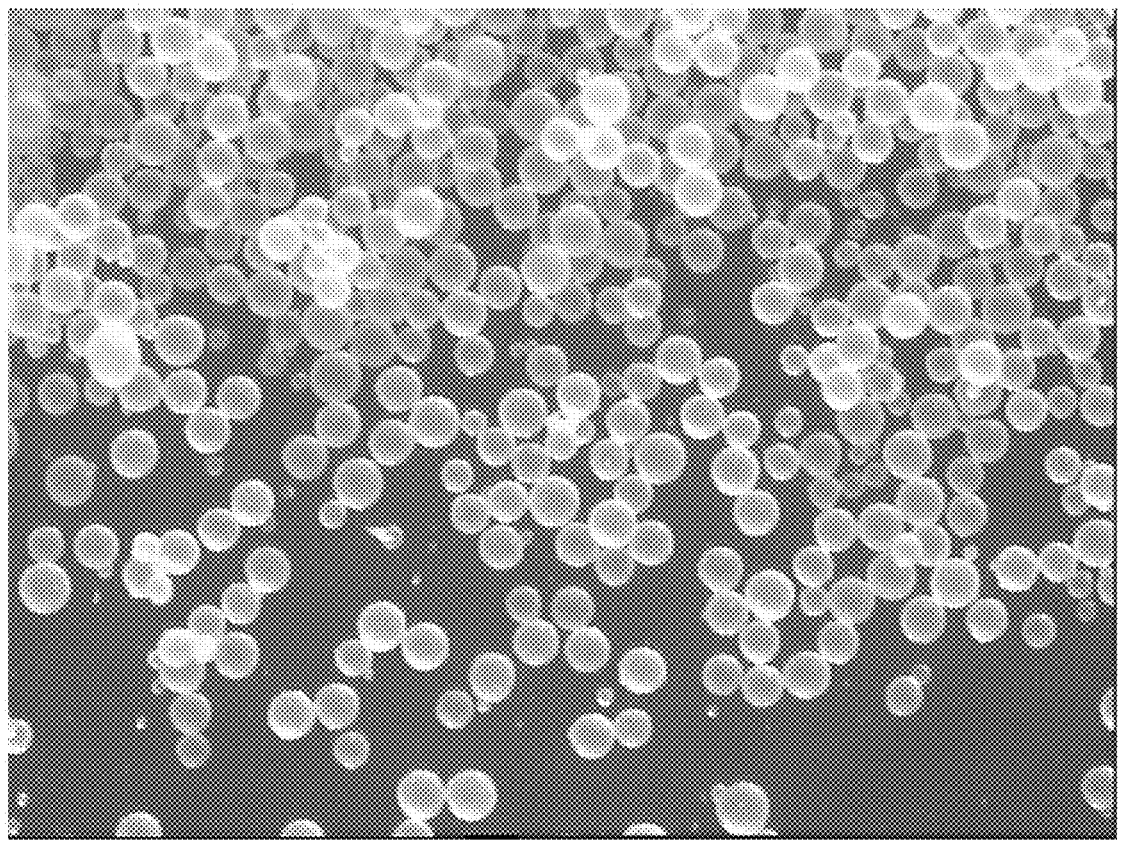
FIG. 3 is an optical microscope photograph of a spherical carrier for an olefin polymerization catalyst prepared in Preparation Example 7.

The spherical carrier Z7 for an olefin polymerization catalyst has an average particle diameter (D50) of 45.1 microns. As it is observed through an optical microscope, particles of the spherical carrier Z7 for an olefin polymerization catalyst have relatively regular morphology and smooth surfaces, are basically all spherical, have a relatively narrow particle size distribution, and have basically no non-spherical particles, as shown in FIG. 3.

Preparation Example 8

This preparation example is used to illustrate a spherical carrier for an olefin polymerization catalyst provided by the present invention and a preparation method thereof.

8.0 g (0.08 mol) of magnesium chloride, 28 mL (0.48 mol) of ethanol, 5 mL of tetramethylthiuram monosulfide, 1 g of PVP (polyvinylpyrrolidone) as a surfactant were added to a 0.6-L reactor, and heated under stirring to 70° C. A resulting mixture was subjected to a reaction at 70° C. for 1 hour, followed by adding 11.2 mL (0.16 mol) of epoxypropane, and then again subjected to a reaction at 70° C. for 20 minutes. After that, a resulting mixture was subjected to filter pressing. A product resulted from the filter pressing was washed with hexane five times. Finally, a resulting product was vacuum dried to obtain a spherical carrier Z8 for an olefin polymerization catalyst.

Figure 4:
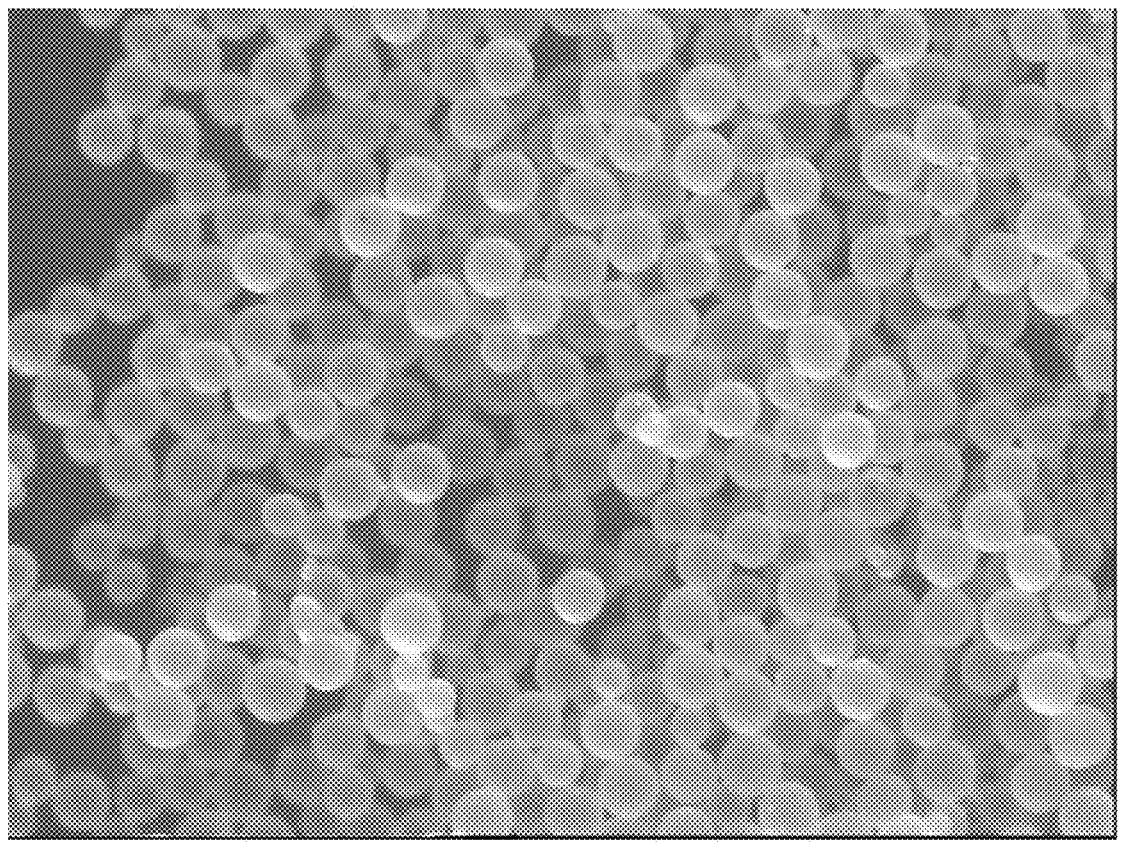
FIG. 4 is an optical microscope photograph of a spherical carrier for an olefin polymerization catalyst prepared in Preparation Example 8.

The spherical carrier Z8 of an olefin polymerization catalyst has an average particle diameter (D50) of 50.1 microns. As it is observed through an optical microscope, particles of the spherical carrier Z8 for an olefin polymerization catalyst have relatively regular morphology and smooth surfaces, are basically all spherical, have a relatively narrow particle size distribution, and have basically no non-spherical particles, as shown in FIG. 4.

Comparative Preparation Example 1

This comparative preparation example is used to illustrate a spherical carrier for an olefin polymerization catalyst and a preparation method thereof used for comparison. 0.08 mol of magnesium chloride, 0.96 mol of ethanol, 1 g of PVP (polyvinylpyrrolidone) as a surfactant were added to a 0.6-L reactor, and heated under stirring to 90° C. A resulting mixture was subjected to a reaction at 90° C. for 2 hours, followed by adding 38 mL (0.48 mol) of epoxychloropropane, and then again subjected to a reaction at 90° C. for 0.5 hour. After that, a resulting mixture was subjected to filter pressing. A product resulted from the filter pressing was washed with hexane five times. Finally, a resulting product was vacuum dried to obtain a spherical carrier DZ1 for an olefin polymerization catalyst.

The spherical carrier DZ1 for an olefin polymerization catalyst has an average particle diameter (D50) of 60 microns, and a particle size distribution ((D90–D10)/D50) of 1.3. Morphology of particles of the carrier observed through an optical microscope is as shown in FIG. 4. As can be seen from FIG. 4, the particles of the carrier DZ1 for an olefin polymerization catalyst include non-spherical particles, and surfaces of the particles of the carrier DZ1 are relatively rough.

Comparative Preparation Example 2

8.0 g (0.08 mol) of magnesium chloride, 59 mL (0.48 mol) of cyclohexane methanol, 1 g of PVP (polyvinylpyrrolidone) as a surfactant were added to a 0.6-L reactor, and heated under stirring to 60° C. A resulting mixture was subjected to a reaction at 60° C. for 1 hour, followed by adding 12.5 mL (0.16 mol) of epoxychloropropane, and then again subjected to a reaction at 60° C. for 20 minutes. After that, a resulting mixture was subjected to filter pressing. A product resulted from the filter pressing was washed with hexane five times. Finally, a resulting product was vacuum dried to obtain a spherical carrier DZ2 for an olefin polymerization catalyst.

Figure 5:
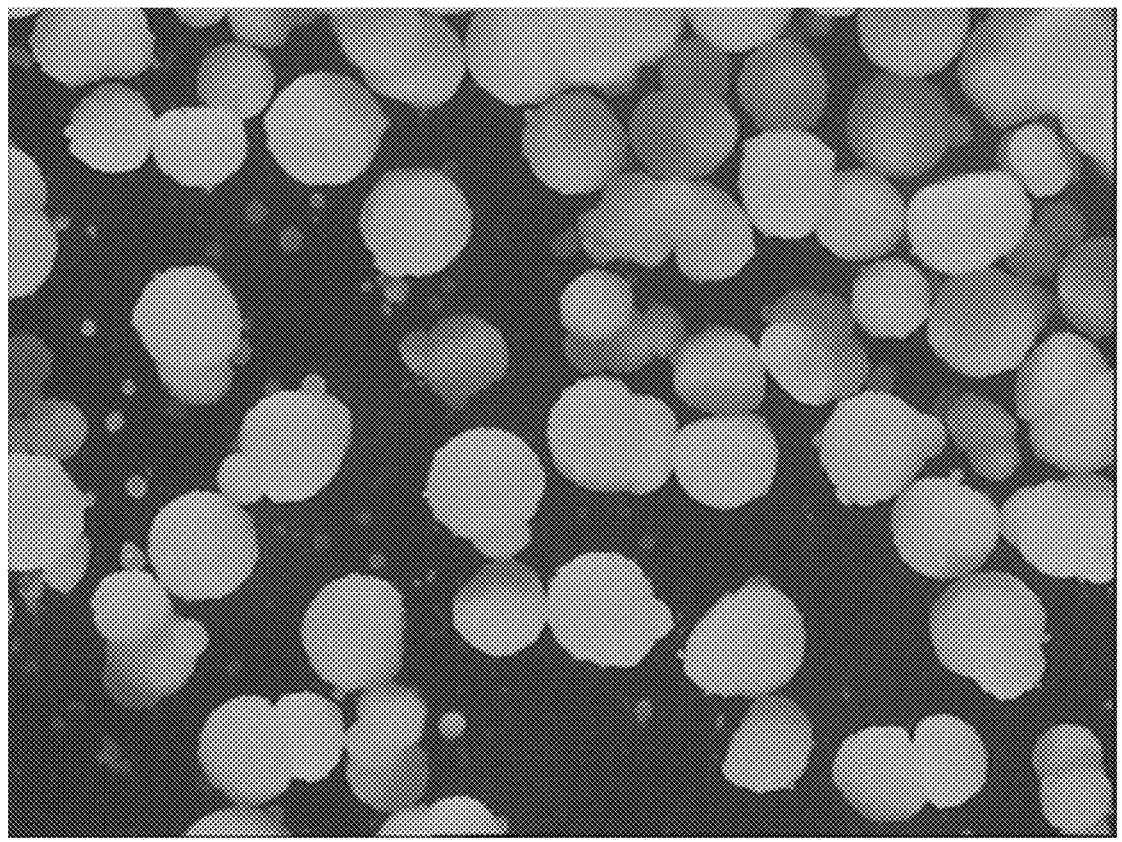
FIG. 5 is an optical microscope photograph of a carrier for an olefin polymerization catalyst prepared in Comparative Preparation Example 1.

The spherical carrier DZ1 for an olefin polymerization catalyst has an average particle diameter (D50) of 60 microns, and a particle size distribution ((D90-D10)/D50) of 1.3. Morphology of particles of the carrier observed through an optical microscope is as shown in FIG. 5. As can be seen from FIG. 5, the particles of the carrier DZ1 for an olefin polymerization catalyst include non-spherical particles, and surfaces of the particles of the carrier DZ1 are relatively rough.

Comparative Preparation Example 3

8.0 g (0.08 mol) of magnesium chloride, 28 mL (0.48 mol) of ethanol, 1 g of PVP (polyvinylpyrrolidone) as a surfactant were added to a 0.6-L reactor, and heated under stirring to 70° C. A resulting mixture was subjected to a reaction at 70° C. for 1 hour, followed by adding 11.2 mL (0.16 mol) of epoxypropane, and then again subjected to a reaction at 70° C. for 20 minutes. After that, a resulting mixture was subjected to filter pressing. A product resulted from the filter pressing was washed with hexane five times. Finally, a resulting product was vacuum dried to obtain a spherical carrier DZ3 for an olefin polymerization catalyst.

The spherical carrier DZ3 for an olefin polymerization catalyst has an average particle diameter (D50) of 88 microns, and a particle size distribution ((D90−D10)/D50) of 1.7. Morphology of particles of the carrier was observed through an optical microscope. The particles of the carrier DZ3 include non-spherical particles, and surfaces of the particles of the carrier DZ3 are relatively rough.

Example 1

This example is used to illustrate preparation of an olefin polymerization catalyst provided by the present invention.
(1) Preparation of an Olefin Polymerization Catalyst 100 mL of titanium tetrachloride was added to a 300-mL glass reaction flask, cooled to −20° C., followed by adding 40 g of the spherical carrier Z1 for an olefin polymerization catalyst obtained in Preparation Example 1, stirred at −20° C. for 30 minutes, and then heated slowly to 110° C. During the heating, 1.5 mL of diisobutyl phthalate was added. After a resulting mixture was maintained at 110° C. for 30 minutes, a liquid was filtered off. A resulting product was washed with titanium tetrachloride twice and then washed with hexane three times, and finally dried to obtain a catalyst C1 for olefin polymerization.
(2) Propylene Polymerization A 5-L stainless steel autoclave was purged with a nitrogen gas flow, and then into the 5-L stainless steel autoclave were introduced, under the protection of the nitrogen gas flow, 1 mmol of triethyl aluminum in hexane (the concentration of triethyl aluminum is 0.5 mmol/mL), 0.05 mmol of methylcyclohexyldimethoxysilane, 10 mL of anhydrous hexane, 10 mg of the catalyst C1 for olefin polymerization obtained in step (1), 1.5 L (standard volume) of hydrogen, and 2.5 L of liquid propylene. A resulting mixture was heated to 70° C., reacted at 70° C. for 1 hour, cooled, followed by pressure releasing, discharged, and then dried to obtain a polypropylene powder P1.

The catalyst C1 for olefin polymerization has an average particle diameter (D50) of 14 microns, a particle size distribution of 0.6, and an activity of 38.9 kgPP/g·cat. The polypropylene powder P1 has a melt flow rate index of 12.0 g/10 min, and a bulk density of 0.46 g/cm$^3$. In addition, particles of the polypropylene powder P1 have good morphology, and have basically no non-spherical particles.

Example 2

This example is used to illustrate preparation of an olefin polymerization catalyst provided by the present invention.

A catalyst for olefin polymerization was prepared and propylene polymerization was carried out in a same way as those in Example 1, except that the spherical carrier Z1 for an olefin polymerization catalyst was substituted with the spherical carrier Z2 for an olefin polymerization catalyst prepared in Preparation Example 2. A catalyst C2 for olefin polymerization and a polypropylene powder P2 were obtained.

The catalyst C2 for olefin polymerization has an average particle diameter (D50) of 17 microns, a particle size distribution of 0.6, and an activity of 37.8 kgPP/g·cat. The polypropylene powder P2 has a melt flow rate index of 11.0 g/10 min, and a bulk density of 0.46 g/cm$^3$. In addition, particles of the polypropylene powder P2 have good morphology, and have basically no non-spherical particles.

Example 3

This example is used to illustrate preparation of an olefin polymerization catalyst provided by the present invention.

A catalyst for olefin polymerization was prepared and propylene polymerization was carried out in a same way as those in Example 1, except that the spherical carrier Z1 for an olefin polymerization catalyst was substituted with the spherical carrier Z3 for an olefin polymerization catalyst prepared in Preparation Example 3. A catalyst C3 for olefin polymerization and a polypropylene powder P3 were obtained.

The catalyst C3 for olefin polymerization has an average particle diameter (D50) of 19 microns, a particle size distribution of 0.7, and an activity of 37.0 kgPP/g·cat. The polypropylene powder P3 has a melt flow rate index of 12.0 g/10 min, and a bulk density of 0.46 g/cm$^3$. In addition, particles of the polypropylene powder P3 have good morphology, and have basically no non-spherical particles.

Example 4

This example is used to illustrate preparation of an olefin polymerization catalyst provided by the present invention.

A catalyst for olefin polymerization was prepared and propylene polymerization was carried out in a same way as those in Example 1, except that the hydrogen added was 6.5 L rather than 1.5 L (standard volume). A polypropylene powder P4 was obtained.

The catalyst C1 for olefin polymerization has an activity of 40.0 kgPP/g·cat. The polypropylene powder P4 has a melt flow rate index of 45.0 g/10 min, and a bulk density of 0.46 g/cm$^3$. In addition, particles of the polypropylene powder P4 have good morphology, and have basically no non-spherical particles.

Example 5

A catalyst for olefin polymerization was prepared and propylene polymerization was carried out in a same way as those in Example 1, except that the spherical carrier Z1 for an olefin polymerization catalyst was substituted with the spherical carrier Z4 for an olefin polymerization catalyst prepared in Preparation Example 4. A catalyst C5 for olefin polymerization and a polypropylene powder P5 were obtained.

The catalyst C5 for olefin polymerization has an average particle diameter (D50) of 23 microns, a particle size distribution of 0.8, and an activity of 37.6 kgPP/g·cat. The polypropylene powder P5 has a melt flow rate index of 11.1 g/10 min, and a bulk density of 0.46 g/cm$^3$. In addition, particles of the polypropylene powder P5 have good morphology, and have basically no non-spherical particles.

Example 6

A catalyst for olefin polymerization was prepared and propylene polymerization was carried out in a same way as those in Example 5, except that the hydrogen added was 6.5 L rather than 1.5 L (standard volume). A polypropylene powder P6 was obtained.

The catalyst C5 for olefin polymerization has an activity of 39.7 kgPP/g·cat. The polypropylene powder P6 has a melt flow rate index of 45.2 g/10 min, and a bulk density of 0.46 g/cm$^3$. In addition, particles of the polypropylene powder P6 have good morphology, and have basically no non-spherical particles.

Example 7

A catalyst for olefin polymerization was prepared and propylene polymerization was carried out in a same way as those in Example 1, except that the spherical carrier Z1 for an olefin polymerization catalyst was substituted with the spherical carrier Z5 for an olefin polymerization catalyst prepared in Preparation Example 5. A catalyst C7 for olefin polymerization and a polypropylene powder P7 were obtained.

The catalyst C7 for olefin polymerization has an average particle diameter (D50) of 25 microns, a particle size distribution of 0.8, and an activity of 37.1 kgPP/g·cat. The polypropylene powder P7 has a melt flow rate index of 11.2 g/10 min, and a bulk density of 0.46 g/cm$^3$. In addition, particles of the polypropylene powder P7 have good morphology, and have basically no non-spherical particles.

Example 8

A catalyst for olefin polymerization was prepared and propylene polymerization was carried out in a same way as those in Example 7, except that the hydrogen added was 6.5 L rather than 1.5 L (standard volume). A polypropylene powder P8 was obtained.

The catalyst C7 for olefin polymerization has an activity of 39.8 kgPP/g·cat. The polypropylene powder P8 has a melt flow rate index of 45.7 g/10 min, and a bulk density of 0.46 g/cm$^3$. In addition, particles of the polypropylene powder P8 have good morphology, and have basically no non-spherical particles.

Comparative Example 1

This comparative example is used to illustrate preparation of a catalyst for olefin polymerization used for comparison.

A catalyst for olefin polymerization was prepared and propylene polymerization was carried out in a same way as those in Example 1, except that the spherical carrier Z1 for an olefin polymerization catalyst was substituted with the spherical carrier DZ1 for an olefin polymerization catalyst prepared in Comparative Preparation Example 1. A catalyst DC1 for olefin polymerization and a polypropylene powder DP1 were obtained.

The catalyst DC1 for olefin polymerization has an average particle diameter (D50) of 58 microns, a particle size distribution of 1.2, and an activity of 32.0 kgPP/g·cat. The polypropylene powder DP1 has a melt flow rate index of 7.0 g/10 min, and a bulk density of 0.39 g/cm$^3$. In addition, there are non-spherical particles among particles of the polypropylene powder DP1.

Comparative Example 2

A catalyst for olefin polymerization was prepared and propylene polymerization was carried out in a same way as those in Comparative Example 1, except that the hydrogen added was 6.5 L rather than 1.5 L (standard volume). A polypropylene powder DP2 was obtained.

The catalyst DC1 for olefin polymerization has an activity of 33.1 kgPP/g·cat. The polypropylene powder DP2 has a melt flow rate index of 37.0 g/10 min, and a bulk density of 0.39 g/cm$^3$. In addition, there are non-spherical particles among particles of the polypropylene powder DP2 and fluidity of the polypropylene powder DP2 is not good.

Comparative Example 3

This comparative example is used to illustrate preparation of a catalyst for olefin polymerization used for comparison.

A catalyst for olefin polymerization was prepared and propylene polymerization was carried out in a same way as those in Example 1, except that the spherical carrier Z1 for an olefin polymerization catalyst was substituted with the spherical carrier DZ2 for an olefin polymerization catalyst prepared in Comparative Preparation Example 2. A catalyst DC3 for olefin polymerization and a polypropylene powder DP3 were obtained.

The catalyst DC3 for olefin polymerization has an average particle diameter (D50) of 66 microns, a particle size distribution of 1.4, and an activity of 32.3 kgPP/g·cat. The polypropylene powder DP3 has a melt flow rate index of 7.4 g/10 min, and a bulk density of 0.39 g/cm$^3$. In addition, there are non-spherical particles among particles of the polypropylene powder DP3 and fluidity of the polypropylene powder DP3 is not good.

Comparative Example 4

A catalyst for olefin polymerization was prepared and propylene polymerization was carried out in a same way as those in Comparative Example 3, except that the hydrogen added was 6.5 L 30 rather than 1.5 L (standard volume). A polypropylene powder DP4 was obtained.

The catalyst DC3 for olefin polymerization has an activity of 33.6 kgPP/g·cat. The polypropylene powder DP4 has a melt flow rate index of 37.7 g/10 min, and a bulk density of 0.39 g/cm$^3$. In addition, there are non-spherical particles among particles of the polypropylene powder DP4 and fluidity of the polypropylene powder DP4 is not good.

Comparative Example 5

This comparative example is used to illustrate preparation of a catalyst for olefin polymerization used for comparison.

A catalyst for olefin polymerization was prepared and propylene polymerization was carried out in a same way as those in Example 1, except that the spherical carrier Z1 for an olefin polymerization catalyst was substituted with the spherical carrier DZ3 for an olefin polymerization catalyst prepared in Comparative Preparation Example 3. A catalyst DC5 for olefin polymerization and a polypropylene powder DP5 were obtained.

The catalyst DC5 for olefin polymerization has an average particle diameter (D50) of 83 microns, a particle size distribution of 1.6, and an activity of 32.8 kgPP/g·cat. The polypropylene powder DP5 has a melt flow rate index of 7.8 g/10 min, and a bulk density of 0.38 g/cm$^3$. In addition, there are non-spherical particles among particles of the polypropylene powder DP5 and fluidity of the polypropylene powder DP5 is not good.

Comparative Example 6

A catalyst for olefin polymerization was prepared and propylene polymerization was carried out in a same way as those in Comparative Example 5, except that the hydrogen added was 6.5 L rather than 1.5 L (standard volume). A polypropylene powder DP6 was obtained.

The catalyst DC5 for olefin polymerization has an activity of 34.0 kgPP/g·cat. The 30 polypropylene powder DP6 has a melt flow rate index of 37.5 g/10 min, and a bulk density of 0.37 g/cm$^3$. In addition, there are non-spherical particles among particles of the polypropylene powder DP6 and fluidity of the polypropylene powder DP6 is not good.

As can be seen from the above results, the spherical carriers for an olefin polymerization catalyst that have a novel composition according to the present invention have a narrow particle size distribution, good particle morphology, a smooth surface, and basically no non-spherical particles. The catalysts prepared with the carriers have a narrow particle size distribution, an improved activity and enhanced sensitive hydrogen response, and can increase the bulk density of a polymerized product when used in polymerization of an olefin (especially propylene); and the polymerized product is basically free of a non-spherical material. The spherical carriers for an olefin polymerization catalyst of the present invention have a great industrial application prospect.

End values of and any values in the ranges disclosed herein are not limited to the precise range or value. These ranges or values should be interpreted as including values close to these ranges or values. For numerical ranges, one or more new numerical ranges may be formed between end values of each range, between an end value of each range and an individual value in the range, and between individual values in each range, and these numerical ranges formed should be considered as having been specifically disclosed herein.

The above describes preferred embodiments of the present invention. However, the present invention is not limited to specific details in the above embodiments. Various simple modifications can be made to the technical solutions of the present invention within the scope of the technical concept of the present invention, and all these simple modifications should fall within the protection scope of the present invention.

The invention claimed is:

1. A carrier for an olefin polymerization catalyst, comprising a magnesium-containing compound and sulfur, wherein the sulfur is an elemental sulfur or 2-mercaptoethanol, and
the magnesium-containing compound is

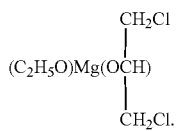

2. The carrier according to claim 1, wherein a molar ratio of magnesium in the magnesium-containing compound to the sulfur is 1:q, wherein 0<q≤0.5.

3. The carrier according to claim 2, wherein 0.0001<q≤0.3.

4. The carrier according to claim 3, wherein 0.001<q≤0.1.

5. The carrier according to claim 1, wherein the carrier is spherical or quasi-spherical, and has an average particle diameter of less than or equal to 30 microns.

6. The carrier according to claim 5, wherein the carrier has an average particle diameter of less than or equal to 20 microns.

7. The carrier according to claim 1, wherein the carrier is spherical or quasi-spherical, and has a particle size distribution of less than 1.2.

8. The carrier according to claim 7, wherein the carrier has a particle size distribution of less than or equal to 0.8.

9. The carrier according to claim 1, wherein raw materials for synthesizing the carrier comprise an elemental sulfur or 2-mercaptoethaol, magnesium chloride, ethanol, and an epoxychloropropane.

10. A method for preparing a carrier for an olefin polymerization catalyst according to claim 1, comprising the following steps:
(1) preparing a mixture, wherein the mixture comprises an elemental sulfur or 2-mercaptoethanol, magnesium chloride, ethanol, an optional inert liquid medium, and an optional surfactant; and
(2) contacting and reacting the mixture obtained in step (1) with epoxychloropropane.

11. The method according to claim 10, wherein based on 1 mol of magnesium chloride, the elemental sulfur or 2-mercaptoethanol is present in an amount of 0.0001-0.5 mol; ethanol is present in an amount of 4-30 mol; and epoxychloropropane is present in an amount of 1-10 mol.

12. The method according to claim 11, wherein based on 1 mol of magnesium chloride, ethanol is present in an amount of 6-20 mol, and epoxychloropropane is present in an amount of 2-6 mol.

13. The method according to claim 10, wherein step (1) comprises mixing elemental sulfur or 2-mercaptoethanol, magnesium chloride, ethanol, the optional inert liquid medium, and the optional surfactant together at one time or step by step and then heating the mixture at a temperature of 80-120° C. for a time period of 0.5-5 hours.

14. The method according to claim 10, wherein in step (2), the contacting and reacting is conducted at a temperature of 40-120° C. for a time period of 15-60 minutes.

15. The method according to claim 10, wherein the inert liquid medium is at least one selected from the group consisting of kerosene, paraffin oil, petrolatum oil, white oil, methyl silicone oil, ethyl silicone oil, methyl ethyl silicone oil, phenyl silicone oil, and methyl phenyl silicone; and/or
based on 1 mol of magnesium chloride, the inert liquid medium is present in an amount of 0.8-10 L.

16. The preparation method according to claim 10, wherein the surfactant is at least one selected from the group consisting of polyvinylpyrrolidone, polyethylene glycol, polyvinyl alcohol, polyacrylic acid, polyacrylate, polyacrylamide, polystyrene sulfonate, naphthalenesulfonic acid formaldehyde condensate, condensed alkyl phenyl ether sulfate, condensed alkyl phenol polyoxyethylene ether phosphate, oxyalkyl acrylate copolymer modified polyethyleneimine, 1-dodeca-4-vinylpyridine bromide polymer, polyvinylbenzyltrimethylamine salt, polyethylene oxide propylene oxide block copolymer, polyvinylpyrrolidone vinyl acetate copolymer, alkyl phenyl polyoxyethylene ether, and polyalkyl methacrylate; and/or
based on 1 mol of magnesium chloride, the surfactant is present in an amount of 1-20 g.

17. The method according to claim 10, wherein the elemental sulfur is at least one selected from α-sulfur, β-sulfur, γ-sulfur, and polymeric sulfur.

18. A catalyst component for olefin polymerization, comprising a reaction product resulted from a reaction of the carrier according to claim 1 with a titanium compound and an optional electron donor.

19. A catalyst component for olefin polymerization, comprising the carrier according to claim 1, titanium, and an optional electron donor.

20. The catalyst component according to claim 19, wherein the catalyst component is spherical or quasi-spherical, and has an average particle diameter of less than or equal to 30 microns.

21. The catalyst component according to claim 19, wherein the catalyst component is spherical or quasi-spherical, and has a particle size distribution of less than 1.2.

22. A catalyst for olefin polymerization, comprising:

the catalyst component according to claim 19;
an alkyl aluminum compound; and
an optional external electron donor compound.

23. An olefin polymerization method, comprising: contacting one or more olefins with the catalyst according to claim 22 under olefin polymerization conditions, wherein the olefin is an olefin represented by $CH_2=CHR$, R being selected from hydrogen and $C_1$-$C_6$ linear or branched alkyl.

* * * * *